July 20, 1926.

J. E. T. HABEL ET AL 1,592,847

TIRE CHAIN

Filed March 1, 1926

INVENTORS
J. E. T. Habel & D. D. Davis
BY: E. J. Fetherstonhaugh
ATTORNEY.

Patented July 20, 1926.  1,592,847

UNITED STATES PATENT OFFICE.

JOSEPH EMILE THOMAS HABEL AND DAVID DOMENIC DEVITO, OF NEUVILLE, QUEBEC, CANADA.

TIRE CHAIN.

Application filed March 1, 1926. Serial No. 91,468.

The invention relates to a tire chain, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to insure a good grip on the roadway and thus avoid the dangers incident to the skidding of the wheels and consequent loss of control; to facilitate the application of the links for ice and mud roads respectively and effect the proper grip for one or the other simply by the reversal of the links; to produce links of very considerable strength and thereby economize in so far as replacements are concerned and to do this at a moderate cost so as to bring these links within the existent selling prices or thereabouts; and generally to provide an efficient link of a durable nature and universally applicable to vehicle tires.

In the drawings, Figure 1 is a fragmentary plan view of a tire showing the chain applied for winter roads.

Like numerals of reference indicate corresponding parts in the various figures.

Figure 1:
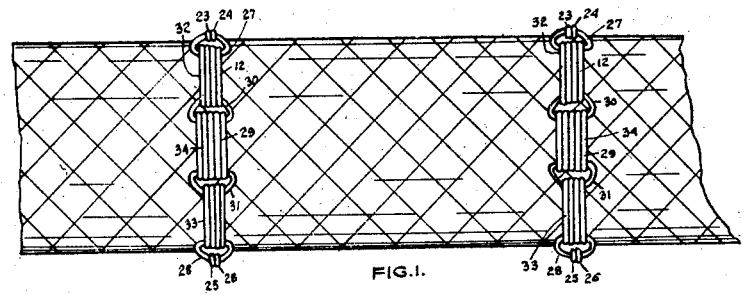
Figure 3:
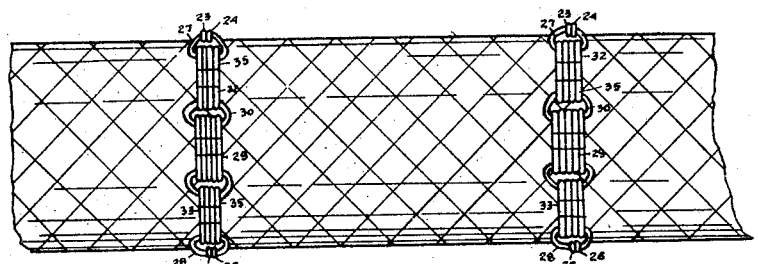
Figure 3 is a fragmentary view of a tire showing a plan view of the chain mounting for mud roads.
Figures 2, 4:
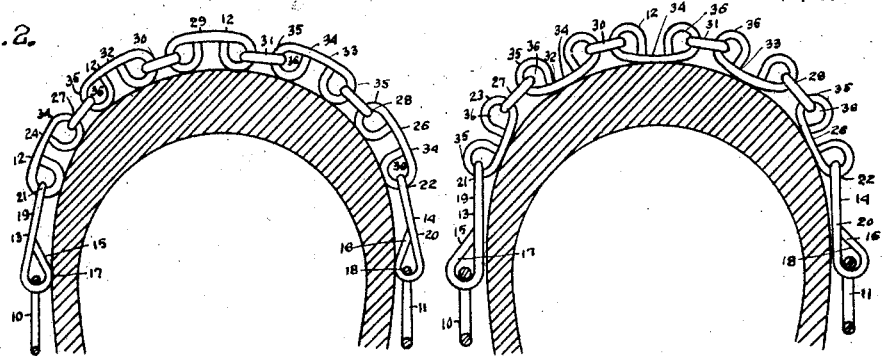
Figure 2 is a cross sectional view of the tire showing the gripping links in side elevation as applied to winter roads.
Figure 4 is a cross sectional view of the tire showing a side elevation of the gripping links as applied to mud roads.
Figure 5:
Figure 5 is a detail of one of the gripping cross chains showing more particularly the tread side for ordinary use.
Figure 6:
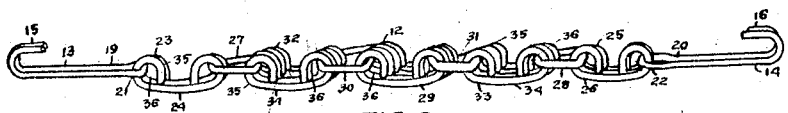
Figure 6 is a detail of a gripping cross chain showing the tread side for softer roads.

Referring to the drawings, the numerals 10 and 11 indicate the ordinary endless anchor chains on the sides of the wheel.

The gripping links 12 have the end clamping links 13 and 14 formed with hook ends 15 and 16 respectively adapted to be clamped and form the double eyes 17 and 18 in engagement with the anchor chains 10 and 11 respectively.

The inner ends of the links 13 and 14 flare outwardly from the double stems 19 and 20 to form the closed flat loops 21 and 22 which are connected to the eye links 23 and 24 at the one end and 25 and 26 at the other end.

The stout ring 27 engages the eye links 23 and 24 at their other ends and the stout ring 28 engages the eye links 25 and 26 at their other ends, consequently the beginning of the cross chains or links is made from either end.

The central eye links 29 in plurality carry the oval ring 30 at one end and the oval ring 31 at the other end and these rings 30 and 31 are joined to the rings 27 and 28 by the plurality of eye rings 32 and the plurality of eye rings 33 respectively.

It is desirable to have the greatest number of eye links grouped in the middle of the cross chain and a lesser number in the next groups on either side and still a lesser number in the end groups. Usually there are five in the middle group, four each in the next group and two in the outer groups, but these numbers are not arbitrary as much depends on the size of the tire and the class of work for the chains.

Each eye link is formed of the bar centre and back 34 and the curled and closed ends 35 forming the eyes 36 leaving the bars 34 exposed completely on the back and partially exposed between the eyes on the inner and front sides.

It will be seen from the aforesaid constructional features that the cross chains or links form on the back a tread surface without projections, but with sufficient gripping powers to definitely hold the wheel from side slipping and to the road surface for driving purposes, but on the ice roads and hard snow roads, the cross chains are reversed and on this side the curled eyes act as calks and give the wheels a hard grip of the road not otherwise obtainable.

It must be noted that this curve in the cross links affords an excellent bearing on the tire casing as all surfaces of the side cross links that may come in contact with the rubber casing are smooth and even. On the one side where the curled eyes are used as calks the wide flat surfaces of the group links effect a very easy bearing on the rubber casing, and this is particularly important, when it is taken into consideration that the calks are only put into service when the road is icy or a very hard snow road, consequently the contact of the cross links with the casing is extremely strenuous, so much so that the side links are pushed in against the pneumatic pressure from the inside, thereby bringing the flat grouped surfaces in extremely close relation to said casing, and therefore causing less harm to the tire casing in rough work.

On the other hand when a tread is on the flat side of the links the eyes are curved in to the bars to such an extent as to effect contact with the casing, that is by no means injurious, especially as the smooth side of the chain is used on comparatively easy roads, usually a clay road or other soft bed, which yields sufficiently to take most of the pressure away from the casing.

There are many other important features in this invention almost too numerous to take up in detail, but it may be said generally that a number of grouped links will avoid many breakages and therefore eliminate repairs and replacements to a large extent, and as these links stand sideways and are not flat to the tread the wearing properties will naturally be very much improved.

What is claimed is:—

In a tire chain, a central group of links formed of wire bars curled at the ends to form eyes, rings through said eyes drawing the links together, a smaller group on either side of said central group of similar links, rings from said smaller groups, clamping links, and link connections to the outer rings from said clamping links.

Signed at Montreal, Canada, this 11th day of February, 1926.

JOSEPH EMILE THOMAS HABEL.
DAVID DOMENIC DEVITO.